Aug. 22, 1967

M. L. B. RAO 3,337,336

ADDITION AGENTS FOR SINTERING PURPOSES

Filed March 17, 1967

FABRICATION OF AMALGAMATED ZINC ANODE
USING CORROSION SINTERING AGENT

INVENTOR.
MLARUR L. B. RAO
BY
ATTORNEY

Aug. 22, 1967  M. L. B. RAO  3,337,336
ADDITION AGENTS FOR SINTERING PURPOSES
Filed March 17, 1967  3 Sheets-Sheet 2

FABRICATION OF AMALGAMATED ZINC ANODE
USING ELECTROCHEMICAL DISPLACEMENT SINTERING AGENT

INVENTOR.
MLARUR L. B. RAO
BY
ATTORNEY

Aug. 22, 1967  M. L. B. RAO  3,337,336
ADDITION AGENTS FOR SINTERING PURPOSES
Filed March 17, 1967  3 Sheets-Sheet 3

INVENTOR.
MLARUR L. B. RAO
BY
ATTORNEY

Patented Aug. 22, 1967

3,337,336
ADDITION AGENTS FOR SINTERING
PURPOSES
Mlarur L. B. Rao, Burlington, Mass., assignor to P. R. Mallory & Co. Inc., Indianapolis, Ind., a corporation of Delaware
Filed Mar. 17, 1967, Ser. No. 624,034
10 Claims. (Cl. 75—201)

ABSTRACT OF THE DISCLOSURE

A process for fabricating highly porous amalgamated zinc anodes using sintering means which undergo exothermic decomposition when mixed with zinc powder having an impurity oxide film thereby cleaning the impurity oxide film from the zinc particles. When the mix of the sintering means and the zinc powder are subjected to pressure, the heat liberated by the exothermic decomposition effects the sintering of the clean zinc particles thereby eliminating the necessity of subjecting the zinc particles to a sintering temperature for a determined length of time. The zinc particles are coated with mercury so as to form an amalgamated zinc anode. A second process for fabricating the highly porous amalgamated zinc anode utilizes sintering means which clean the impurity oxide film from the zinc particles by an electrochemical displacement reaction and partially sinters the zinc during the displacement reaction. The sintering of the zinc is completed by the application of heat thereto. The zinc particles are coated with mercury thereby providing an amalgamated zinc anode.

The present invention relates to means and methods for the fabrication of an amalgamated zinc anode, and more particularly, to the fabrication of amalgamated zinc anodes for use in batteries.

The mercury battery includes, as a negative terminal, an amalgamated zinc anode fabricated from compacted zinc powder coated with mercury. The mercury is used to coat the zinc so that any impurity sites existing therein are covered thereby preventing gassing at the impurity site. Gassing seriously undermines the operation of the mercury battery.

It is known that the efficiency of the mercury battery depends to a great extent on the surface area of the amalgamated zinc anode structure. It is seen, therefore, that a need exists for a simple and efficient method of producing amalgamated zinc anodes which have a high porosity that can be readily controlled during manufacture and easily reproduced on a mass production basis. Several of the prior methods for fabricating amalgamated zinc anodes used the compacting and sintering technique to provide an amalgamated zinc anode. Several problems develop using this method. For example, the pressing step must necessarily result in metal to metal contact between the zinc particles so that the grain growth necessary to provide a porous and structurally strong sintered mass occurs during the sintering operation. Commercial zinc powder is 99+ percent pure but includes an impurity oxide film of about 0.01 to about 1.0 percent by weight of the particle. It is seen that the impurity oxide film on the zinc particles must be removed or broken down in acceptable manner in order to permit the necessary metal to metal contact so that sintering of the particles may take place. If metal to metal contact is not achieved, the amalgamated zinc anode will have low porosity thereby seriously affecting the efficiency of the mercury battery and/or the anode structure will be weak and have a tendency to crumble when handled.

Attempts have been made in the prior art to add volatile organic solvents and binders, metal hydrides and metal fuel powders to assist in the sintering of the metal powder. However, the present invention involves an altogether different method of approach to the sintering of zinc powder to provide an amalgamated zinc anode having a porosity of about 10 to 85 percent.

Therefore, it is an object of the present invention to provide a class of chemical means which effect sintering so as to produce an amalgamated zinc anode having great porosity thereby increasing the efficiency of a mercury battery.

Another object of the present invention is to provide a method of fabricating amalgamated zinc anodes that is efficient, effective and accurately controls the porosity of the anodes.

A further object of the present invention is to provide an amalgamated zinc anode which eliminates the need for ancillary binders and fillers to insure the desired sintering of the particles and the required porosity of the resultant sintered body.

A further object of the present invention is to provide an amalgamated zinc anode having a porosity of between 10 and 85 percent that is easily and conveniently controlled.

Another object of the present invention is to provide an amalgamated zinc anode for a mercury battery, during the fabrication of which the zinc particles are cleaned of the impurity oxide film and sufficient heat is developed by the cleaning of the particles to sinter the zinc thereby forming a porous, sintered structure.

Still another object of the present invention is to provide a sintering means which undergoes exothermic decomposition under certain conditions and when mixed with zinc powder having an impurity oxide film, the powder is cleaned of the film thereby liberating heat sufficient to sinter the powder.

Another object of the present invention is to provide a mix of zinc having an impurity oxide film and a sintering agent which chemically react liberating heat effecting the sintering of the metals thereby eliminating the necessity for the application of ancillary heat to the compact to effect sintering.

Yet another object of the present invention is to provide a porous sintered pellet, of homogenized and uniform density, formed as an amalgamated zinc structure.

Yet still another object of the present invention is to provide a class of sintering agents which clean an impurity oxide film from zinc particles in situ by an electrochemical displacement action, the reaction partially effecting sintering, the sintering completed upon the application of heat to the partially sintered zinc particles.

A further object of the present invention is to provide a method of sintering amalgamated zinc anodes which reduces the sintering temperature and time over several known methods in the prior art.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and appended claims.

Figure 1:
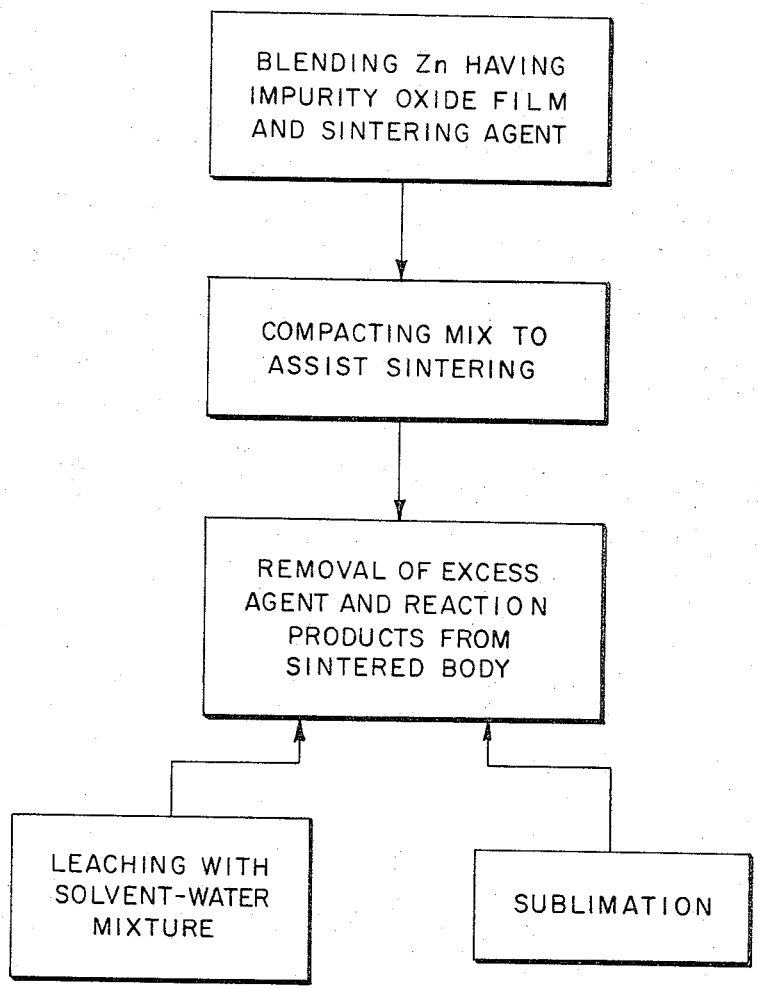
FIGURE 1 illustrates the steps used to fabricate an amalgamated zinc anode wherein a corrosion sintering agent is used.
Figure 2:
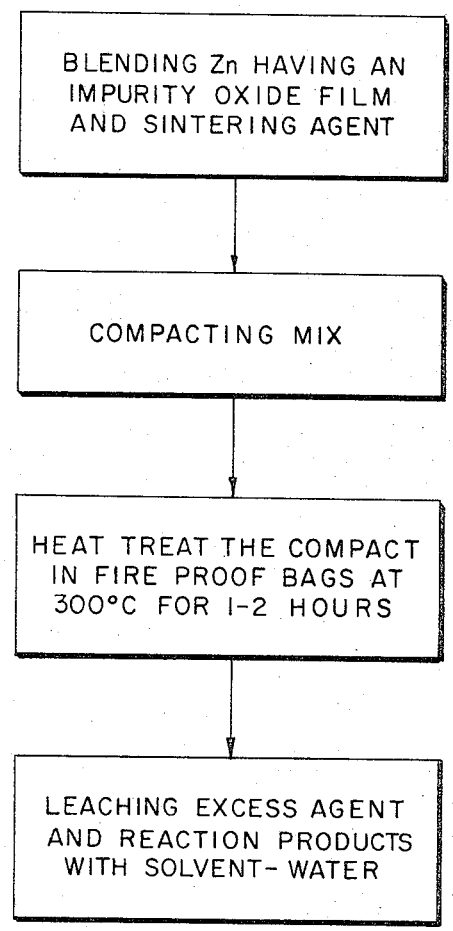
FIGURE 2 illustrates the steps used to fabricate an amalgamated zinc anode wherein an electrochemical sintering agent is used.

Generally speaking, the present invention relates to the fabrication of a highly porous amalgamated zinc anode using a chemical corrosion process and/or the utilization of the electromotive force differences that exist at the metal-molten salt interfaces to remove the impurity oxide film on the zinc power to produce an alloying or amalgamated bond between the zinc particles. Two distinct classes of sintering means or agents meet the objectives of the present invention. One of the classes of agents serves to clean the impurity oxide film from the surface of the zinc particles in situ and sinter the particles by chemical corrosion, double decomposition, redox process, or fluxing thereby producing metal to metal contact and heat sufficient to produce a sintered zinc amalgamated structure having high porosity. The other of the classes of sintering agents serve to clean the surface of the particles and are involved in surface alloy formation due to the electrochemical displacement reactions with the metal powders to be sintered.

The first of the two methods involves the mixing of commercial zinc powder with chemical agents such as the halides of ammonia and aluminum, ammonium acid oxalate, hydrazine hydrochloride and the like in quantities of 10 to 60 percent by weight of the total weight of the mixture, 80 to 40 percent by weight zinc powder and 1 to 10 percent by weight mercuric chloride are mixed and compacted at 1000 to 20,000 p.s.i. The chemical agent causes a reaction between the agent and the impurity oxide film carried on the surface of the metal particles. The compacting pressure accelerates the chemical reaction between the chemical agent and the impurity oxide film on the zinc particles. During compacting, the chemical reaction cleans the metal particles in situ and liberates heat sufficient to sinter the compact to thereby form a porous, amalgamated zinc structure. The compact is heated to a temperature of about ⅓ the melting point temperature of the amalgamated zinc to sublime the excess chemical agent, or the chemical agent is leached with an organic solvent-water mixture. A porous amalgamated zinc structure is obtained having a porosity of 10 to 85 percent.

The second of the processes uses a class of sintering agent which clean the impurity oxide film from the zinc powder in situ by an electrochemical displacement reaction. The reaction partially effects sintering of the zinc particles, the sintering being completed upon the application of heat to the system.

The resultant amalgamated zinc anode may have much greater porosity and includes much more consistent surface area affording better electrolytic conductivity and lower impedance, and has greater ability to retain more electrolyte than several of the anodes previously available.

The addition of ammonium chloride and a mercuric salt to commercial zinc powder, mixing and subsequent compacting of the mix results in an exothermic chemical reaction which removes the impurity oxide film from the zinc powders thereby cleaning the zinc powder in situ. The heat evolved during the chemical reaction is about 23 to 40 kcal./mole depending upon whether or not gaseous or aqueous ammonia is formed during the reaction. It is thought that both aqueous and gaseous ammonia is formed and, as such, the heat liberated during the reaction falls between 23 and 40 kcal./mole. The activation process for the sintering of metals has been recognized to take place partly by vapor diffusion, and mainly by surface diffusion of the atoms of the sintering surfaces. The order of magnitude of this energy is about 10 to 15 kcal./mole. The mix is subjected to compacting pressures of 1000 to 20,000 p.s.i. at substantially the same time that the chemical reaction takes place. The solid-solid reaction between the metal powder and the sintering agent does not occur to any great extent until the two materials are brought into intimate contact. The application of pressure to the mixture of zinc and ammonium chloride establishes the intimate contact, and thus an extensive chemical reaction occurs to change the chemical composition of the impurity oxide film on the zinc powder. The heat evolved during the reaction is sufficient to sinter the zinc powder since the heat liberated exceeds 10 to 15 kcal./mole required to sinter metals. The sintered zinc further reacts with the mercuric salt to form an amalgamated zinc structure. The excess ammonium chloride, zinc chloride and other reaction products are removed by further application of heat to sublime said excess products. As an alternative, the excess products may be leached from the structure by a suitable organic solvent-water mixture having a low dielectric constant so as to prevent further corrosion of the sintered mass. A suitable organic solvent-water mixture would be acetone and water.

In general, the weight percent of the sintering agent determines the porosity of the resultant anode. However, it is only a relative guide and the porosity may vary depending on the particle size of the zinc powder, the extent of the oxide coating on the zinc, compacting pressure and the like parameters.

In addition to ammonium chloride other sintering agents such as aluminum chloride, hydrazine hydrochloride and ammonium acid oxalate are suitable substitute sintering agents for ammonium chloride. When any of the above sintering agents are utilized, the heat liberated in the chemical reaction ranges from 10 to 50 kcal./mole. The magnitudes of these heats liberated during compacting is sufficient to sinter the zinc particles so that the application of external heat to the compact is unnecessary to accomplish sintering. The application of additional heat to the sintered mass is used to sublime the excess sintering agents and any resultant reaction products therefrom. It is noted, that a sublimation heat required is approximately 140° C. which is about ⅓ the sintering temperature of the amalgamated zinc anode. It is seen, that this temperature is insufficient to sinter the structure.

Figure 3:
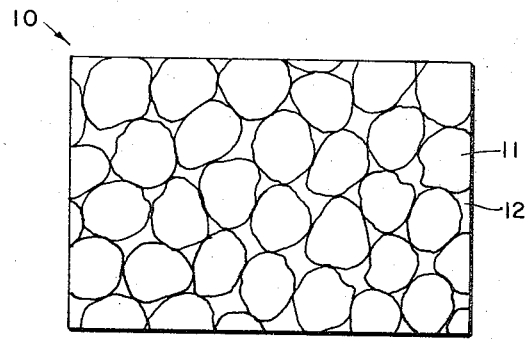
FIGURE 3 is a photomicrograph of about 30 magnifications of a porous, pressed zinc specimen of zinc particles having a particle size of about 400 microns illustrating the distinctive grain boundaries of the individual zinc particles.

FIGURE 3 shows a porous zinc powder compact 10 showing zinc particles 11 having an impurity oxide film and the void or porous areas 12. The compact was formed in a press under compacting pressures of about 15,000 p.s.i. Note the distinctive grain boundaries of the individual particles showing the very little, if any, coalescence occurs.

Figure 4:
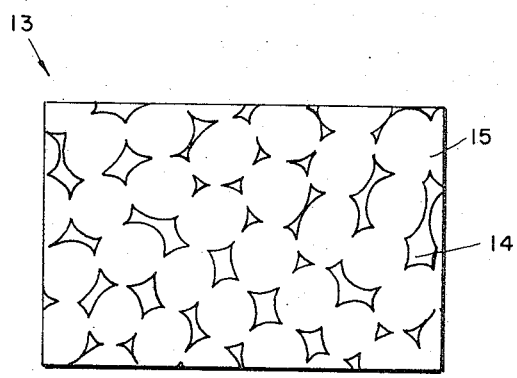
FIGURE 4 is a photomicrograph of about 30 magnifications of porous zinc specimen sintered in accordance with the teachings of the present invention illustrating the coalescence of the individual particles.

FIGURE 4 shows a porous, sintered zinc structure 13 showing the clean zinc particles 15 and void or porous areas 14. The structure was prepared blending 80 percent, by weight, commercial zinc powder and 20 percent, by weight, ammonium chloride. The blend was compacted at about 15,000 p.s.i. during the chemical reaction resulting in the sintered structure of FIGURE 4. Note the coalescence of the clean zinc particles through grain boundary interdiffusion due to the sintering forces.

Figure 5:
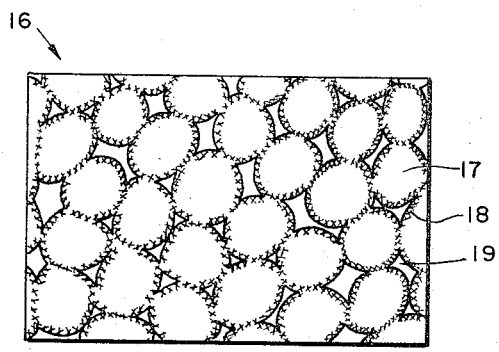
FIGURE 5 is a photomicrograph of about 30 magnifications of a porous zinc specimen illustrating the amalgamation of the porous zinc specimen when prepared in accordance with the teachings of the present invention.

FIGURE 5 shows a porous, sintered amalgamated coating 18 surrounding the zinc particles and void or porous areas 19. The structure was prepared by blending 80 percent, by weight, commercial zinc powder, 10 percent, by weight, ammonium chloride and the remainder mercuric chloride. The blend was compacted at about 15,000 p.s.i. during the chemical reaction resulting in the sintered structure of FIGURE 5. Note the coalescence of the clean zinc powder and the amalgamated coating substantially surrounding said particles.

The sintering agents used in the second method of preparing the amalgamated zinc anode makes use of the electromotive force difference that exists between the various metals. It is known that zinc displaces, for example, antimony silver, mercury from their molten halide salts. Therefore, when one mixes zinc powder with mercuric chloride and heats the compact to about 300° C., the mercuric chloride becomes molten and electrochemical reactions involving the formation of amalgamated zinc results. The zinc surface of the metal-molten salt interface is cleaned in situ exposing the metal and allowing the desired sintering to take place. The mercury coats the zinc thereby forming an amalgamated zinc anode. The sintering bonds may involve Zn—Zn, Zn—Hg—Zn and/or Zn—Hg—Hg—Zn and others. The sintering bonds are then intensified by subjecting the mass to external heat.

It is seen that both methods clean the zinc particles in situ and therefore no additional step is necessary to remove the impurity oxide film from the zinc particles prior to compacting. The impurity oxide film prevents the formation of adequate sintering bonds and thus it is seen that the methods disclosed herein have overcome one of the greatest difficulties in sintering zinc powder. A suitable salt must be selected before either of the methods may be used to form an amalgamated zinc anode. In the decomposition process at least 10 kcal./mole must be liberated during the chemical reaction before the zinc particles will be sintered. In the case of the second process, the cation of halide must be below the zinc on the electromotive force series. The concentration of the salt anions and the cations involved depends upon the mechanical strength and the porosity of the sintered mass desired and the impurity levels that the resultant mass can tolerate.

The salt is thoroughly mixed with the powder or fiber to be sintered in either dry form or by employing suitable carriers in the form of wet paste in water or other suitable solvents. The mix is then compacted at about 1000 to 20,000 p.s.i. In the first class of sintering agents, the heat liberated and the pressure applied is sufficient to sinter the zinc particles. In the case of the second method the compact is sintered in a suitable atmosphere.

The Examples 1–8 illustrate the fabrication of an amalgamated zinc anode using the sintering agents ammonium chloride, aluminum chloride, hydrazine hydrochloride and ammonium acid oxalate. The Examples 9 to 11 illustrate the fabrication of an amalgamated zinc anode using differences in the electromotive force of metals to remove the oxide film from zinc powder.

*Example 1*

An amalgamated zinc anode having a porosity of about 85 percent.

Ammonium chloride was added to a mixture of commercial zinc powder having an impurity oxide film and a particle size of about 850 microns and mercuric chloride. The mixture consisted of about 59 percent, by weight, ammonium chloride, about 40 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 1000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 85 percent.

The procedure of Example 1 was followed using each of the sintering agents aluminum chloride, hydrazine hydrochloride and ammonium acid oxalate in the amounts specified above. It will be appreciated that the porosity of the anode will vary from that specified above due to the different densities of the sintering agents. The excess amounts of the sintering agent and corrosion reaction products were removed either by sublimation or by an acetone and water solution. In each instance the zinc structure was found to be amalgamated and highly porous.

*Example 2*

An amalgamated zinc anode having a porosity of about 85 percent.

Ammonium chloride was added to a mixture of commercial zinc powder having an impurity oxide film and a particle size of about 300 microns and mercuric chloride. The mixture consisted of about 59 percent, by weight, ammonium chloride, about 40 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 15,000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 85 percent.

The procedure of Example 2 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 3*

An amalgamated zinc anode having a porosity of about 80 percent.

Ammonium chloride was added to a mixture of commercial zinc powder having an impurity oxide film and a particle size of about 400 microns and mercuric chloride. The mixture consisted of about 50 percent, by weight, ammonium chloride, about 48 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at 15,000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 80 percent.

The procedure of Example 3 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 4*

An amalgamated zinc anode having a porosity of about 75 percent.

Ammonium chloride was added to a mixture of commercial zinc powder having an impurity oxide film and a particle size of about 400 microns and mercuric chloride. The mixture consisted of about 40 percent, by weight, ammonium chloride, about 57 percent, by weight, zince powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 5000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 75 percent.

The procedure of Example 4 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 5*

An amalgamated zinc anode having a porosity of about 65 percent.

Ammonium chloride was added to a mixture of commercial zinc powder having an impurity oxide film and a particle size of about 400 microns and mercuric chloride. The mixture consisted of about 30 percent, by weight, ammonium chloride, about 65 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 15,000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 65 percent.

The procedure of Example 5 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 6*

An amalgamated zinc anode having a porosity of about 55 percent.

Ammonium chloride was added to a mixture of commercial zinc powder having an impurity oxide film and a particle size of about 200 microns and mercuric chloride. The mixture consisted of about 20 percent, by weight, ammonium chloride, about 75 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 15,000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 55 percent.

The procedure of Example 6 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 7*

An amalgamated zinc anode having a porosity of about 20 percent.

Ammonium chloride was added to a mixture of commercial zinc powder having an impurity oxide film and a particle size of about 400 microns and mercuric chloride. The mixture consisted of about 10 percent, by weight, ammonium chloride, about 80 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 15,000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 20 percent.

The procedure of Example 7 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 8*

An amalgamated zinc anode having a porosity of about 10 percent.

Ammonium chloride was added to a mixture of commercial zinc powder having an impurity oxide film and a particle size of about 500 microns and mercuric chloride.

The mixture consisted of about 10 percent, by weight, ammonium chloride, about 80 percent, by weight, zinc powder and the remainder mercuric chloride. The ammonium chloride acts as a sintering agent and as a filler which determines to some extent the porosity of the resultant structure. The mixture was blended and was pressed in any suitable means such as an automatic press at a suitable pressure so as to effect sintering of the zinc particles. The heat liberated by the exothermic reaction and the application of pressure resulted in a sintered structure. Compacting at about 20,000 p.s.i. accelerated the exothermic reaction formed in a sintered compact that was structurally sound. The excess ammonium chloride and the resultant corrosion products were removed by subliming at a temperature of about 140° C. The resultant zinc structure was found to be amalgamated and had a porosity of about 10 percent.

The procedure of Example 8 was followed using each of the sintering agents aluminum chloride, hydrazine hydrochloride and ammonium acid oxalate in the amounts specified above. The excess amounts of the sintering agent and corrosion reaction products were removed either by sublimation or by an acetone water solution. In each instance the zinc structure was found to be amalgamated and porous.

*Example 9*

Approximately 2 percent by weight mercuric chloride was added to a sample of degreased 99.99 pure 100 micron zinc powder having an impurity oxide film. The chemicals were mixed and compacted in dies at about 15,000 p.s.i. The samples of green mass were heat treated in fireproof paper bags at 300° C. for a period of 1 to 2 hours. After completion of heat treatment, the compacts were washed with an acetone-water mixture and dried. The resultant amalgamated zinc structures were porous, structurally sound, water stable and had a porosity of about 40 percent.

*Example 10*

The procedure of Example 9 was followed using a compacting pressure of about 20,000 p.s.i. The resultant structure was structurally sound and had a porosity of about 10 percent.

*Example 11*

The procedure of Example 9 was followed using a compacting pressure of about 20,000 p.s.i. The resultant structure was structurally sound and had a porosity of about 85 percent.

The present invention is not intended to be limited to the disclosure herein, and changes and modifications may be made in the disclosure by those skilled in the art without departing from the spirit and scope of the novel concepts of this invention. Such modifications and variations are considered to be within the purview and scope of this invention and the appended claims.

Having thus described my invention, I claim:

1. A process for fabricating porous sintered amalgamated zinc structures from zinc powder having an impurity oxide film comprising the steps of selecting a sintering agent from the group consisting of the halides of ammonia and aluminum, hydrazine hydrochloride and ammonium acid oxalate, blending 10 to 60 percent by weight of said sintering agent with zinc particles having an impurity oxide film and mercuric chloride initiating a chemical reaction between said sintering agent and said zinc oxide film of said metal particles, compacting said blended mix to form a compact, said chemical reaction cleaning said zinc particles in situ and liberating heat sufficient to sinter said compact to form a porous zinc structure, said mercuric chloride reacting with said clean zinc particles to form amalgamated zinc, and removing the resulting reaction products, the excess of said sintering agent and the excess of said mercuric chloride to prevent further sintering of said sintered compact leaving a porous sintered amalgamated zinc structure.

2. A process for fabricating porous sintered amalgamated zinc structures from zinc powder having an impurity oxide film as claimed in claim 1, wherein said heat liberated during said chemical reaction is about 10 to 50 kcal./mole.

3. A process for fabricating porous sintered amalgamated zinc structures from zinc powder having an impurity oxide film as claimed in claim 1, wherein the particle size of said zinc powder having an impurity oxide film is about 30 to 850 microns.

4. A process for fabricating porous sintered amalgamated zinc structures from zinc powder having an impurity oxide film as claimed in claim 1, wherein said compacting pressure is about 1000 to 20,000 p.s.i.

5. A process for fabricating porous sintered amalgamated zinc structures from zinc powder having an impurity oxide film as claimed in claim 1, wherein said impurity oxide film of said zinc powder is about 0.01 to 1 percent by weight of said powder.

6. A process for fabricating porous sintered amalgamated zinc structures from zinc powder having an impurity oxide film as claimed in claim 1, wherein said reaction products, said excess of said sintering agent and said excess of said mercuric chloride are removed by sublimation at a temperature not greater than ⅓ the sintering temperature of said amalgamated zinc.

7. A process for fabricating porous sintered amalgamated zinc structures from zinc powder having an impurity oxide film as claimed in claim 1, wherein said excess of said sintering agent and said excess of said mercuric chloride and said resulting reaction products are removed by leaching in an organic-water solvent.

8. A process for fabricating porous sintered amalgamated zinc structures from zinc powder having an impurity oxide film as claimed in claim 1, wherein said blended mix includes 40 to 80 percent by weight of said zinc particles having an impurity oxide film and 1 to 10 percent by weight mercuric chloride.

9. A process for fabricating porous sintered amalgamated zinc structures from zinc powder having an impurity oxide film comprising the steps of selecting a sintering agent from a group of sintering agents which liberate 10 to 50 kcal./mole when undergoing an exothermic reaction with zinc particles having an impurity oxide film, mixing said sintering agent, zinc particles having an impurity oxide film and mercuric chloride thereby initiating said exothermic reaction between said sintering agent and said oxide film carried on the surface of said zinc particles, compacting said blended mix to form a compact, said pressure accelerating said exothermic reaction between said sintering agent and said zinc oxide film of said zinc particles, said exothermic reaction cleaning said zinc particles in situ and liberating heat sufficient to sinter said compact to form a porous zinc structure, said mercuric chloride reacting with said clean zinc particles to form amalgamated zinc, and removing the resulting reaction products, the excess of said sintering agent and the excess of said mercuric chloride to prevent further sintering of said sintered compact leaving a porous sintered amalgamated zinc structure.

10. A process for fabricating porous sintered amalgamated zinc structures having a porosity of 10 to 85 percent from zinc powder having an impurity oxide film comprising the steps of selecting a sintering agent from the group consisting of the halide salts of ammonia and aluminum, hydrazine hydrochloride and ammonium acid oxalate, blending about 10 to 60 percent by weight of said sintering agent with about 80 to 40 percent by weight zinc particles having an impurity oxide and a particle size of about 850 microns or less, and about 1 to 10 percent by weight mercuric chloride thereby initiating a chemical reaction between said sintering agent and said oxide film carried on the surface of said zinc particles, compacting said blended mix at a pressure of about 1000 to 20,000 p.s.i to form a compact, said pressure accelerating said chemical reaction between said sintering agent and said zinc oxide film or said zinc particles, said chemical reaction cleaning said zinc particles in situ and liberating heat sufficient to sinter said compact to form a porous zinc structure, said mercuric chloride reacting with said clean zinc particles to form amalgamated zinc, and removing the resulting reaction products, the excess of said sintering agent and the excess of said mercuric chloride to prevent further sintering of said sintered compact leaving a porous sintered amalgamated zinc structure having a porosity of 10 to 85 percent.

References Cited

UNITED STATES PATENTS

| 1,642,348 | 9/1927 | Williams | 75—222 |
| 1,988,861 | 1/1935 | Thorausch | 75—222 |
| 2,122,053 | 6/1938 | Burkhardt | 75—222 |
| 2,985,532 | 5/1961 | Streicher | 75—222 |

BENJAMIN R. PADGETT, *Primary Examiner.*

A. J. STEINER, *Assistant Examiner.*